Patented Jan. 30, 1940

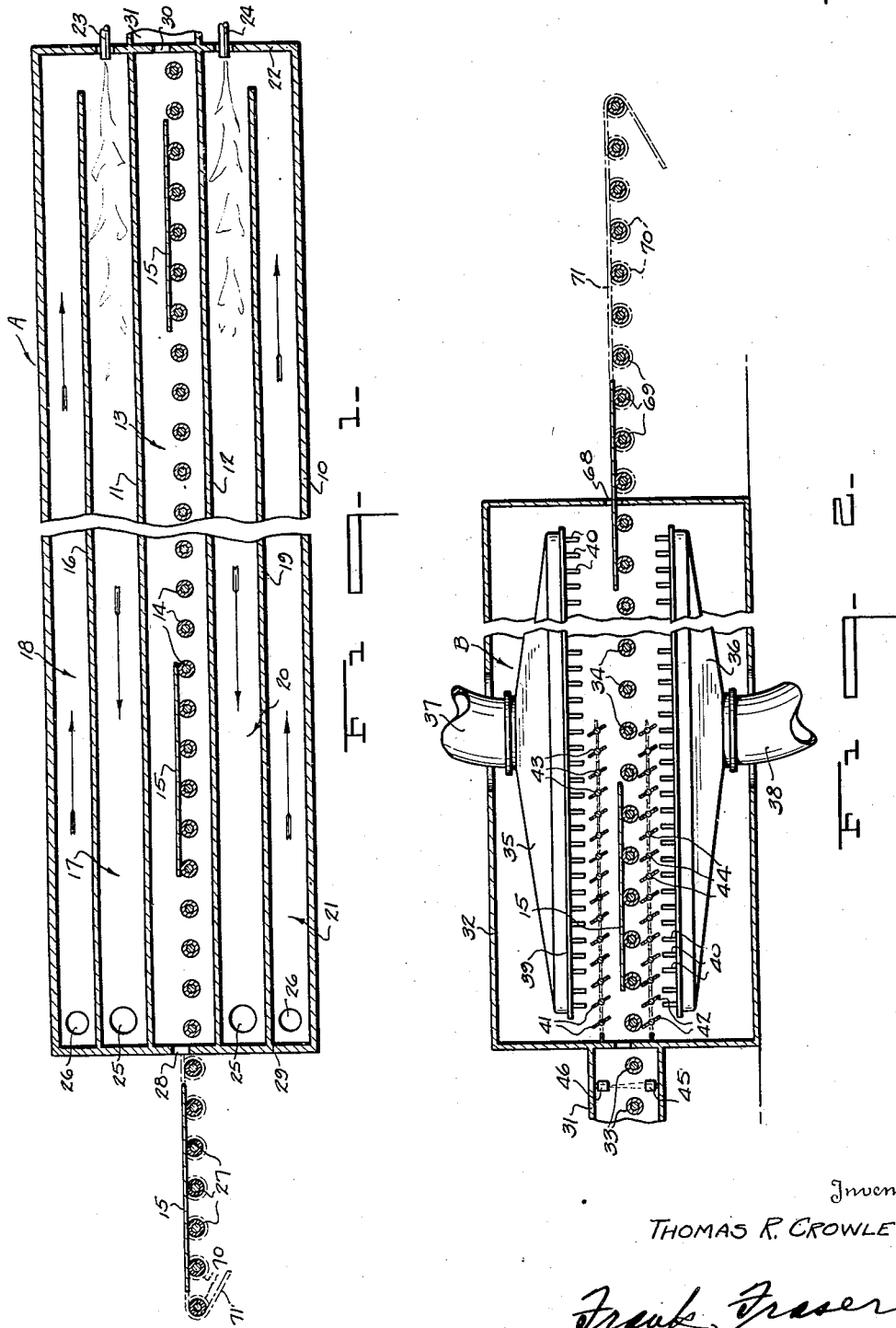

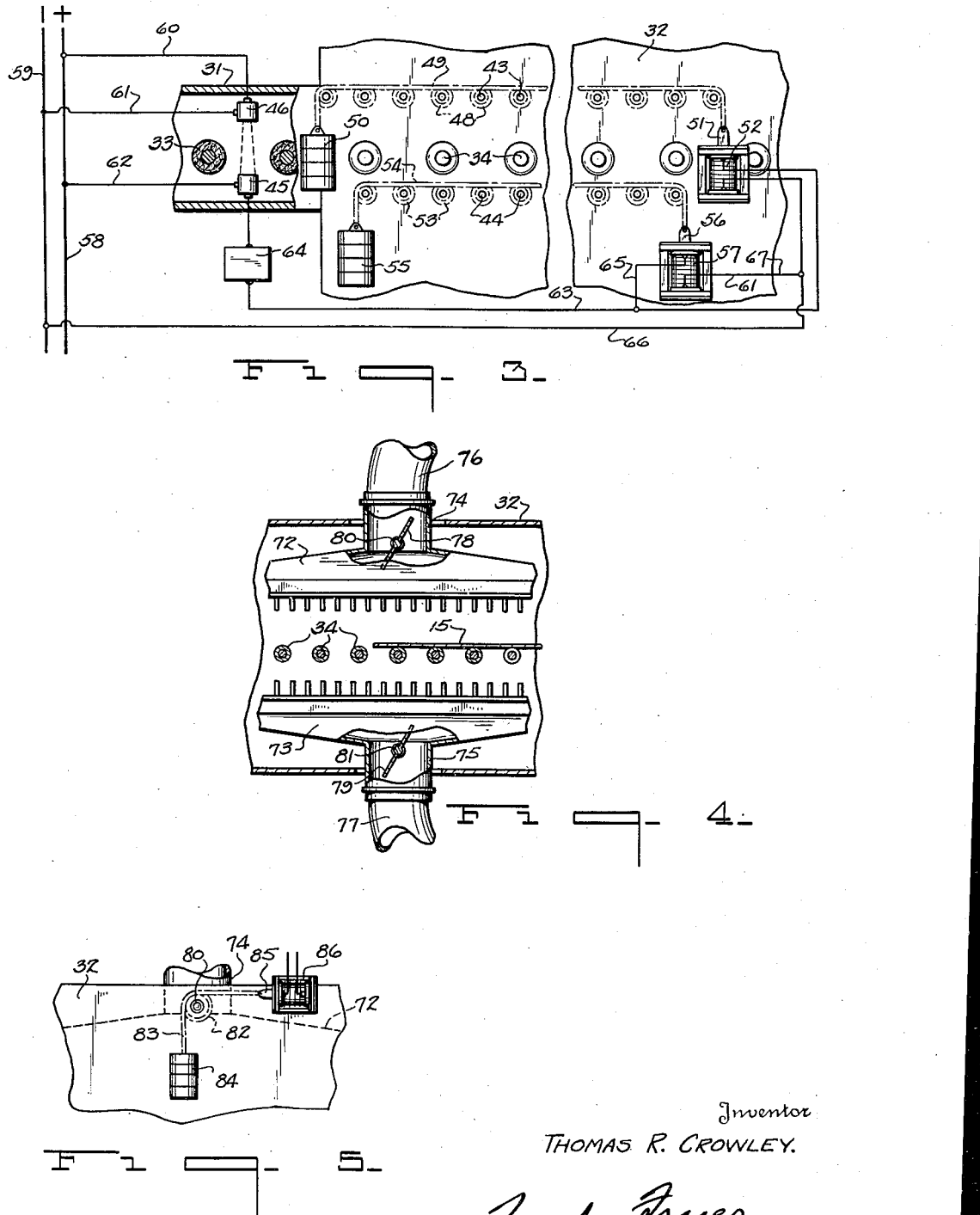

2,188,401

UNITED STATES PATENT OFFICE 2,188,401

APPARATUS FOR TEMPERING GLASS

Thomas R. Crowley, Toledo, Ohio, assignor to Libbey-Owens-Ford Glass Company, Toledo, Ohio, a corporation of Ohio Application June 15, 1937, Serial No. 148,332

8 Claims. (Cl. 49—45)

The present invention relates broadly to the art of tempering and more particularly to improvements in apparatus for use in the tempering of flat sheets or plates of glass.

When tempering glass sheets according to one well known process, the sheets are first heated to approximately the point of softening of the glass and then suddenly chilled to place the outer surfaces of said sheets under compression and the interiors thereof under tension. The treatment of glass sheets in this manner not only materially increases the mechanical strength of the glass but further modifies its breaking characteristics in that, when broken, the glass sheet will disintegrate into innumerable small and relatively harmless particles instead of breaking into large dangerous pieces or slivers as is the case with ordinary glass.

In the practice of the above process, the glass sheet is ordinarily maintained in a vertical position during the treatment thereof and it is customary to suspend the sheet from a plurality of relatively small tongs or hooks which engage the same near its upper edge. The glass sheet is first heated to the desired temperature in a suitable furnace and upon removal therefrom is subjected immediately to the action of suitable cooling devices by which the glass is suddenly chilled. These cooling devices usually comprise spaced blower heads between which the highly heated glass sheet is received and which serve to direct jets of air upon opposite surfaces of the said sheet simultaneously. Glass sheets tempered in the above manner cannot be subsequently cut without causing the complete shattering thereof and must therefore be cut to size before tempering.

The suspending of the glass sheet in a vertical position by means of tongs is, however, not entirely satisfactory due to the fact that the tongs tend to bite into the glass sheet upon the softening thereof, causing slight indentations or depressions which remain in the glass after tempering and which tend to mar the appearance thereof. Further, if the glass sheet is not properly hung from the tongs, it is very apt to become warped or distorted upon being heated to the point of softening of the glass. The marking of the glass by the tongs is particularly objectionable when making enameled glass since the tongs cause a slight flaking of the enamel. Also, the penetration of the tongs causes a definite weakness in the outer surface skins of the glass sheet resulting in a tendency toward spontaneous fracture thereof.

An important object of this invention is the provision of improved tempering apparatus wherein the glass sheet is subjected to both the heating and cooling treatments while maintained in a horizontal or substantially horizontal position and, further, wherein the use of tongs or other supporting means which tend to mar the glass is eliminated.

Another object of the invention is the provision of tempering apparatus of the above character wherein the tempering operations are carried out in a continuous manner and the glass sheet maintained in constant motion during the tempering thereof whereby warping or distortion of the sheet upon softening is reduced to a minimum.

A further object of the invention is the provision of tempering apparatus of the above character embodying novel means for effecting the transfer of the heated glass sheet from the heating means to the cooling means in a manner to facilitate the uniform chilling of the sheet over its entire area whereby to minimize warpage or breakage of the glass.

Other objects and advantages of the invention will become more apparent during the course of the following description and among which may be mentioned the facilitating and expediting of the tempering operations by reduced and easier handling of the glass, increased output with a corresponding decrease in the cost of production, better fuel economy, and the elimination of marking and flaking of the enamel when making enameled tempered glass as well as rendering the glass stronger and less susceptible to spontaneous fracture.

In the drawings wherein like numerals are employed to designate like parts throughout the same, Fig. 1 is a vertical longitudinal sectional view through the means for heating the glass sheets;

Fig. 2 is a similar view through the cooling means which is arranged in substantial horizontal alignment with the heating means to receive the heated sheet therefrom;

Fig. 3 is a side elevation, partially in section, of a portion of the cooling means showing the means for actuating the shields or shutters which protect the sheet when it is initially received by the cooling means;

Fig. 4 is a vertical longitudinal sectional view through a portion of a slightly modified form of cooling means; and Fig. 5 is a side elevation of a portion of the cooling means shown in Fig. 4;

With reference first to that form of the invention illustrated in Figs. 1 to 3 of the drawings, A designates in its entirety the means for heating the glass sheets and B the means for subsequently cooling the same, the heating means and cooling means being preferably arranged in horizontal alignment so that the glass sheets will be passed directly from the former to the latter and immediately acted upon by the said cooling means while still in a uniformly heated condition.

The means A for heating the glass sheets preferably consists of a continuous gas fired muffle furnace 10 substantially rectangular in cross section and the interior thereof being subdivided by the horizontally spaced longitudinally extending partition walls 11 and 12 to provide therebetween the heating chamber 13. Arranged throughout the entire length of the heating chamber are a plurality of horizontally aligned conveyor rolls 14 for supporting the glass sheets 15 to be tempered, said rolls being positively driven to advance the glass sheets through the furnace at a predetermined rate of speed.

Arranged above the partition wall 11 in spaced parallel relation thereto is a horizontal wall 16 which subdivides the space above the heating chamber 13 into a combustion chamber 17 and an air preheating chamber 18, while spaced beneath the partition wall 12 is a wall 19 which subdivides the space beneath the heating chamber into a combustion chamber 20 and an air preheating chamber 21. It will be noted in Fig. 1 that the walls 16 and 19 terminate short of the exit end wall 22 of the furnace so that the air preheating chambers 18 and 21 are in communication at such end of the furnace with the combustion chambers 17 and 20 respectively.

The combustion chambers 17 and 20 may be heated by a suitable number of gas burners 23 and 24 respectively which project into the said chambers through the end wall 22 of the furnace. The products of combustion are adapted to pass from the combustion chambers at the forward end of the furnace through openings 25 which lead to a stack. The air for combustion is adapted to be introduced into the preheating chambers 18 and 21 at the forward end of the furnace through openings 26, and as the air passes longitudinally of the furnace through the preheating chambers, it is preheated before mixing with the gas from the burners whereby to facilitate combustion. The rolls in the forward end of the furnace are preferably asbestos or of other low conductivity material so that there will be no danger of cracking the cold untreated glass while the rolls in the hot end of the furnace are preferably of polished nichrome, steel, or Monel metal in order to withstand the relatively high temperatures.

Arranged outwardly of the forward end of the furnace 10 are a plurality of driven rolls 27 which are in horizontal alignment with the rolls 14. The rolls 27 are adapted to initially receive the cold sheets of glass to be tempered and to deliver these sheets through a slot 28 in the front end wall 29 of the furnace onto the rolls 14. These rolls are preferably of rubber or rubber surfaced.

As the glass sheets 15 are passed through the furnace, they are adapted to be brought to the desired uniform temperature which is in the neighborhood of 1250° F. for ordinary flat glass. The glass sheets, in leaving the furnace, pass through a slot 30 in the end wall 22 thereof and thence through a closed tunnel 31 into a housing 32 in which the cooling means B is located. The tunnel 31 constitutes a continuation of the heating chamber 13 and the glass sheets are carried therethrough upon a series of rolls 33 and thence through the housing 32 upon a series of rolls 34, said rolls 33 and 34 being in horizontal alignment with the rolls 14 and 27.

The cooling means B consists of the superimposed blower heads 35 and 36 arranged respectively above and beneath the rolls 34 and connected by conduits 37 and 38 respectively to suitable blower apparatus. The inner ends of the blower heads are covered by plates 39 provided with a plurality of nipples 40 through which jets of air are directed simultaneously against opposite surfaces of the glass sheets 15 as the said sheets are carried over the rolls 34.

The blower heads are adapted to be operated continuously and in the event the hot glass sheets are exposed gradually to the action of the blower heads as they pass from the tunnel 31 into the housing 32, a decided temperature differential would be set up between the leading and trailing edges of the sheet of glass, and especially a long sheet, which would be very apt to result in warping or even breakage of the said sheet. Consequently, it is desirable and in fact very important that the chilling of the sheet be simultaneous or substantially so over the entire area thereof in order that all portions of the sheet will be acted upon simultaneously and the said sheet uniformly cooled. To this end, the present invention contemplates the provision of means for protecting or shielding the sheet from the action of the blower heads until the entire sheet is in position between said blower heads to be acted upon simultaneously over its entire area. The means herein provided for this purpose comprises a series of pivotally mounted shields or shutters 41 and 42 positioned between the path of travel of the glass sheets and the blower heads 35 and 36 respectively, the shutters 41 being arranged above the glass sheets and the shutters 42 beneath said sheets and also beneath the rolls 34. These shutters are in the form of substantially flat double-winged baffle plates of relatively narrow width which extend transversely throughout the width of the blower heads, said shutters 41 and 42 being mounted on pivot shafts 43 and 44 respectively journaled in the side walls of the housing 32.

During the passage of the glass sheet from the tunnel 31 into the housing 32, the shutters 41 and 42 are adapted to be closed by moving them into horizontal alignment with one another as illustrated by the broken lines in Fig. 2 so as to protect and shield the sheet from the action of the blower heads 35 and 36 which, as pointed out above, are maintained in operation at all times. After the glass sheet has been entirely received between the blower heads, the shutters are adapted to be opened by moving them to an inclined position as indicated by the full lines in Fig. 2 or to a vertical position whereupon the sheet will be exposed to the action of the blower heads and chilling of the said sheet effected. As shown in Fig. 2, the shutters need not extend the entire length of the blower heads but simply a sufficient distance so that the largest sheet of glass to be tempered can be received entirely therebetween. Due to the provision of the pivotally mounted shutters 41 and 42, the glass sheet will not be subjected to the action of the blower heads until it has been received entirely therebetween. Consequently, the sheet will be acted upon simultaneously over its entire area so that a uniform cooling of the said sheet will be effected thereby minimizing the danger of warpage or breakage of the glass and eliminating any objectionable temperature differential between the leading and trailing edges of said sheet.

The opening and closing of the shutters 41 and 42 may be effected in any desired manner but it is preferred that the actuation thereof be controlled by photo-electricity and to this end the apparatus herein provided includes a photo-electric cell 45 disposed in the tunnel 31 preferably closely adjacent the housing 32 and beneath the path of travel of the glass sheet; a source of light 46 being positioned above the path of travel of said sheet and in vertical alignment with the photo-electric cell. As is well known, a photo-electric cell generates an electric current when subjected to light and the operation of the photo-electric cell 45 is adapted to control the operation of the shutters 41 and 42, with the operation of said photo-electric cell being controlled by movement of the glass sheet. In other words, as a sheet of glass 15 passes between the photo-electric cell 45 and source of light 46, it cuts the light beam, thus causing the photo-electric cell to close the shutters and shield the glass from the quenching air until it is entirely between the blower heads. When the glass sheet passes beyond the photo-electric cell and the beam of light again strikes the said cell, the shutters will be automatically opened to permit the quenching of the sheet and will remain open until the next sheet of glass again cuts the light beam.

The apparatus for effecting the actuation of the shutters is shown in Fig. 3. Mounted upon each of the shafts 43 of the shutters 41, outwardly of the housing 32, is a sprocket 48 and trained over these sprockets is a sprocket chain 49 having fastened to one end thereof a weight 50 and being connected at its opposite end to the plunger 51 of a solenoid 52. Each of the shafts 44 of the shutters 42 also carries at one end a sprocket 53 over which is run a sprocket chain 54 having a weight 55 attached to one end and being connected at its opposite end to the plunger 56 of a solenoid 57.

The numerals 58 and 59 designate the positive and negative main lines respectively and the source of light 46 is connected therewith by the wires 60 and 61. Leading from the positive main line 58 to the photo-electric cell 45 is a wire 62 while connected to and leading from the photo-electric cell 45 to the solenoid 52 is a wire 63 in which is interposed a current amplifier 64. A by-pass wire 65 is connected to the wire 63 and leads to the solenoid 57. Leading from the solenoid 52 to the negative main line 59 is a wire 66 and the solenoid 57 is also connected therewith by a line 67.

In operation, when a sheet of glass 15 cuts the beam of light from the source of light 46 to the photo-electric cell 45, the circuit through the solenoids 52 and 57 is broken, whereupon the weights 50 and 55 will rotate the shafts 43 and 44 in a counterclockwise direction to effect the closing of the shutters 41 and 42 so that they will shield the sheet from the cooling means as it passes between the blower heads. On the other hand, when the sheet of glass passes beyond the photo-electric cell, it will again be acted upon by the beam of light, whereupon the circuit through the solenoids 52 and 57 will be completed and upon energization of said solenoids, the plungers 51 and 56 thereof will be drawn downwardly to turn the shafts 43 and 44 in a clockwise direction and thereby cause the opening of the shutters and the exposure of the sheet to the cooling means. The glass sheet, after being properly cooled, leaves the housing 32 through a slot 68 in the rear end wall thereof and is received on a plurality of rolls 69 from which it is picked off by an operator and placed in racks until cold enough to be packed. The rolls 14, 27, 33, 34 and 69 are all in horizontal alignment with one another and can be driven at a constant uniform speed in any desired manner such as providing a sprocket 70 at one end of each roll and training over all of said sprockets a sprocket chain 71 driven from a variable speed motor.

In Figs. 4 and 5 is illustrated a modified cooling apparatus in which the shutters 41 and 42 are eliminated and the blower heads 72 and 73 are provided centrally thereof with reduced cylindrical necks 74 and 75 to which are connected the flexible conduits 76 and 77 respectively running to the blower apparatus. Arranged within the necks 74 and 75 of the blower heads 72 and 73 are dampers 78 and 79 respectively pivotally carried by shafts 80 and 81. These dampers are controlled in the same manner as the shutters 41 and 42; being closed during the passage of the glass sheet from the tunnel 31 into the housing 32, and opened after the sheet is entirely received between the blower heads. For accomplishing this purpose, each of the damper shafts may be provided at one end with a sprocket 82 over which is trained a sprocket chain 83, the chain having attached to one end a weight 84 and connected at its opposite end to the plunger 85 of solenoid 86 which is associated with and controlled by a photo-electric cell in the same manner as described above. Although the dampers 78 and 79 are shown as being arranged in the necks of the blower heads, they can of course be positioned in the flexible conduits 76 and 77 if desired.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for use in the tempering of sheet glass wherein the sheet is first heated to substantially the point of softening of the glass and then suddenly cooled, means for supporting and carrying the heated sheet forwardly, means disposed at opposite sides of the path of travel of the sheet for cooling the said sheet during the forward travel thereof, means also disposed at opposite sides of the path of travel of said sheet for shielding the same from the action of the cooling means until the said sheet is in a predetermined position with respect to said cooling means, and means actuated by the forward travel of the sheet for moving said shielding means into inoperative position when said sheet is in proper position for cooling.

2. In apparatus for use in the tempering of sheet glass wherein the sheet is first heated to substantially the point of softening of the glass and then suddenly cooled, means for supporting and carrying the heated sheet forwardly, means for cooling the sheet during the forward travel thereof including superimposed blower heads between which the sheet passes, and means associated with said blower heads for protecting the sheet from the action of the said blower heads until the said sheet is received entirely between said blower heads.

3. In apparatus for use in the tempering of sheet glass wherein the sheet is first heated to substantially the point of softening of the glass and then suddenly cooled, means for supporting and carrying the heated sheet forwardly, means for cooling the sheet during the forward travel thereof including superimposed blower heads between which the sheet passes, means associated with said blower heads for protecting the sheet from the action of the said blower heads until the said sheet is received entirely between said blower heads, and means actuated by the forward travel of the sheet for moving the protecting means into inoperative position when the said sheet has been received between said blower heads.

4. In apparatus for use in the tempering of sheet glass wherein the sheet is first heated to substantially the point of softening of the glass and then suddenly cooled, means for supporting and carrying the heated sheet forwardly, means for cooling the sheet during the forward travel thereof including superimposed blower heads between which the sheet passes, a series of horizontally arranged, pivotally mounted shutters disposed between each blower head and the path of travel of the glass sheet and when in closed position cooperating to shield the sheet from the action of the blower heads, and means actuated by the forward travel of the sheet for automatically opening said shutters when the said sheet is in a predetermined position with respect to the blower heads.

5. In apparatus for use in the tempering of sheet glass wherein the sheet is first heated to substantially the point of softening of the glass and then suddenly cooled, means for supporting and carrying the heated sheet forwardly, means for cooling the sheet during the forward travel thereof including superimposed blower heads between which the sheet passes, pivotally mounted dampers associated with said blower heads and when in closed position acting to protect the sheet from the action of the said blower heads, and means actuated by the forward travel of the sheet for opening said dampers when the sheet is in a predetermined position with respect to said blower heads.

6. In apparatus for use in the tempering of sheet glass, a horizontal tunnel-type furnace comprising a heating chamber through which the sheet is passed, a tunnel for receiving the sheet from the furnace and constituting a substantial continuation of said heating chamber, a housing for receiving the sheet from said tunnel, cooling apparatus arranged in said housing including superimposed blower heads for receiving the sheet therebetween and effecting the chilling thereof, means associated with said blower heads for protecting the sheet from the action of the blower heads until the said sheet is entirely received between said blower heads, and means actuated by the forward travel of the sheet for automatically moving the protecting means into inoperative position when the said sheet has been entirely received between said blower heads.

7. In apparatus for use in the tempering of sheet glass wherein the sheet is first heated to substantially the point of softening of the glass and then suddenly cooled, means for supporting and carrying the heated sheet forwardly, means disposed at opposite sides of the path of travel of the sheet for cooling said sheet during the forward travel thereof, and means also disposed at opposite sides of the path of travel of the sheet and arranged inwardly of and between said cooling means for shielding said sheet from the action of the cooling means until the said sheet is in a predetermined position between said cooling means.

8. In apparatus for use in the tempering of sheet glass, a horizontal tunnel type furnace comprising a heating chamber through which the sheet is passed, a tunnel for receiving the sheet from the furnace and constituting a substantial continuation of said heating chamber, a housing for receiving the sheet from said tunnel, cooling means arranged in said housing at opposite sides of the path of travel of the sheet for receiving the sheet therebetween and effecting the chilling thereof, and means also disposed at opposite sides of the path of travel of the sheet and arranged inwardly of and between said cooling means for shielding said sheet from the action of the cooling means until the said sheet is in a predetermined position between said cooling means.

THOMAS R. CROWLEY.